Sept. 7, 1965 K. S. T. JANSON ETAL 3,205,440

CONTROL ARRANGEMENT FOR TRANSMISSION OF FREQUENCY SHIFT MODULATED SIGNALS

Filed April 10, 1962

United States Patent Office 3,205,440
Patented Sept. 7, 1965

3,205,440
CONTROL ARRANGEMENT FOR TRANSMISSION OF FREQUENCY SHIFT MODULATED SIGNALS

Knut Stig Torbjörn Janson, Stockholm, Martin Vilhelm Ivan Jeppsson, Spanga, and Kurt Elof Samuel Silversjö, Stockholm, Sweden, assignors to International Standard Electric Corporation, New York, N.Y., a corporation of Delaware Filed Apr. 10, 1962, Ser. No. 186,539
Claims priority, application Sweden, May 10, 1961, 3,736/61
3 Claims. (Cl. 325—41)

Figures 1, 2, 3:
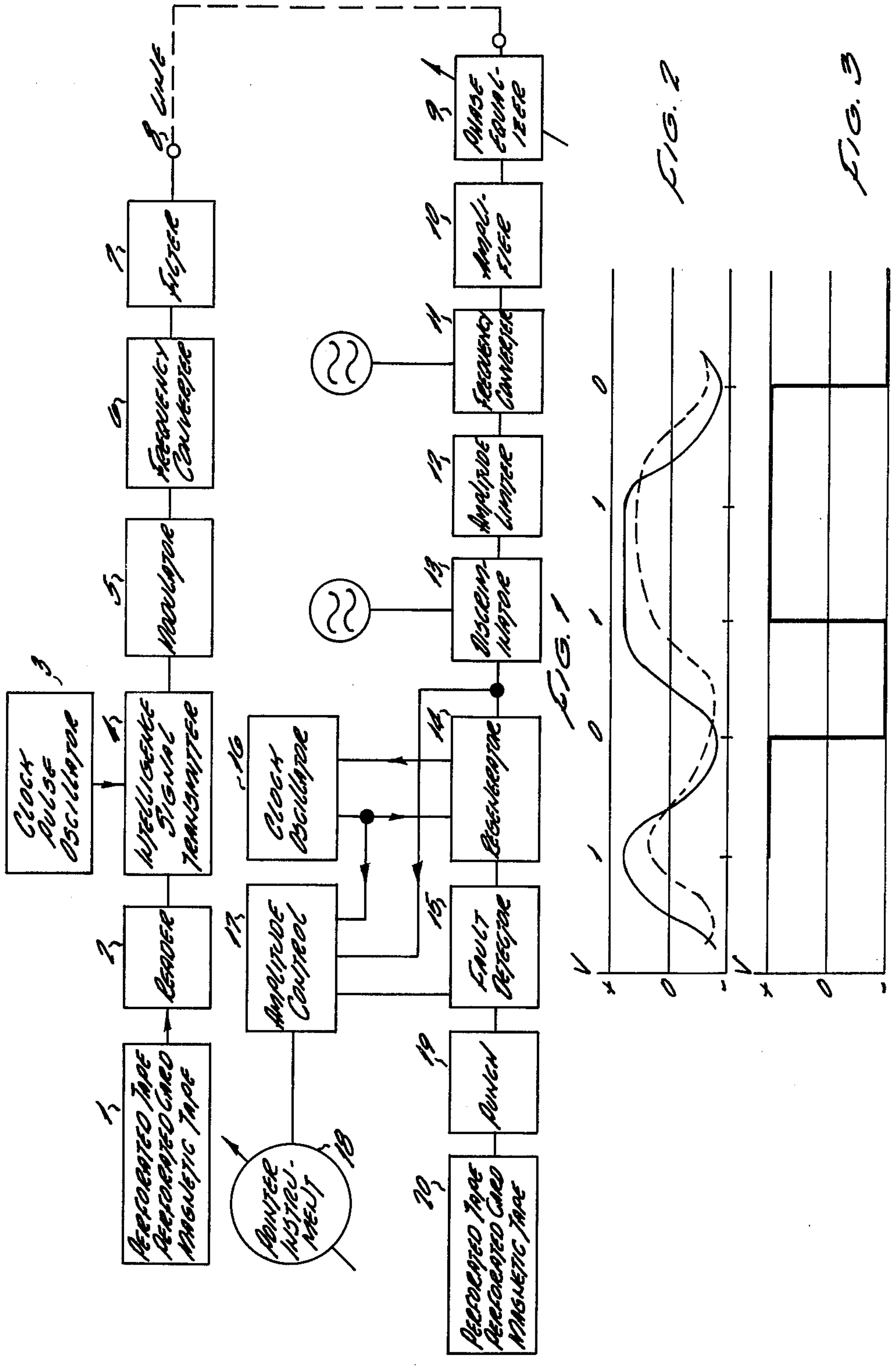

This invention relates to intelligence transmission systems and in particular to error checking control arrangements for such systems. The transmission of intelligence over telephone connections involves quite different requirements than in ordinary telephony, particularly when high transmission speeds are concerned, and this implies that considerably more rigorous requirements must be placed on phase distortion, transient disturbances of very short duration, such as clicks or the like, and short interruptions.

A variety of different methods of modulation have been applied to intelligence transmission and also these methods place requirements of different rigorosities on the telephone connections in the above-mentioned respects. In the following the present invention will be described as applied to frequency shift modulation although also other methods of modulation as well as base-band transmission may be used with the same advantages. As is known to those skilled in the art the frequency shift modulation is characteristerized by the fact that the line signal oscillates in rhythm with the transmitted intelligence pulses between different frequencies although its amplitude is approximately constant.

The invention relates to an equipment having three objects, and by means of this invention it is made possible to control partly whether a given connection is at all capable of performing intelligence transmission and partly if faults occur during such transmission. Finally the utilization of the proposed control equipment allows such setting of adjustable networks for phase equalization that the residual phase distortion is rendered tolerable.

In order to explain the operation of the equipment according to the invention and its application to intelligence transmission there is shown in FIGURE 1 a highly simplified block diagram of a conventional method of intelligence transmission. FIG. 2 shows the output of signal discriminating apparatus and FIG. 3 shows the output of signal regenerating apparatus.

The contents of each of the labeled rectangular blocks are well-known in the transmission field. The details of these well-known items of apparatus may be found in Bell Telephone Laboratories Publication, "Transmission System for Communications," Volumes I and II, copyrighted in 1959; in the book "Understanding Digital Computors" by Paul Siegel, published in 1960 by John Wiley & Sons; and in the publication "Basic Carrier Telephony" by David Talley, Rider Publication No. 258.

Perforated tapes, cards or magnetic tapes 1 in which are stored in binary representation, intelligence to be transmitted are read in a reading device 2 in which the information is converted into binary direct current signals, substantially in parallel form, which means that in intelligence transmission the individual signal elements of each word are transmitted on separate lines or channels. In the intelligence signal transmitter 4 these signal elements are converted from parallel to serial form, whereby the individual signal elements are transmitted one after the other on the same line or channel. A particular clock pulse oscillator 3 controls the transmitter 4, so that the direct current intelligence signals are transmitted to the modulator 5 with a predetermined speed. Such information is then converted in the modulator 5 into alternating current suitable for line transmission, are frequency shifted in converter 6, and undesirable frequency components are filtered out in a filter 7 prior to the transfer of information to the transmission medium 8, e.g. a telephone line.

Information is then transmitted over said line in usual manner and at the receiver end there may be inserted either in advance of or after the line amplifier 10 a variable phase equalization network 9 for the correction of phase faults which might have occurred during the transmission over the telephone line. After possible filtering frequency transposition in 11, amplitude limitation in 12 and demodulation in a discriminator 13 there is obtained binary direct current information in serial form, hereinafter designated base-band signal. Subsequent to the demodulation, regeneration is performed in a regenerator 14 under the control of a clock pulse oscillator 16 being synchronized with the corresponding oscillator 3 at the transmitting end. Then a fault detection may be performed in 15 by means of a known type of e.g. redundancy control, such as parity control, control by cyclic decoding etc., whereupon the information is caused to actuate a punch 19 or the like in a manner known per se. In certain applications the information is being converted from serial into parallel form.

FIG. 2 schematically illustrates the timed response of the base-band signal (potential or current) at the output of the discriminator 13, when an intelligence signal of the stated character has been transmitted by means of phase shift modulation. Similar potential forms or characteristics are also obtained after detection both in connection with other methods of modulation and reception of base-band signals. While the solid line curve represents an ideal case without appreciable phase distortion, disturbances and the like, the dashed curve shows the trend which the corresponding potential may assume in the presence of phase distortion. It is obvious that also disturbances and periods of interruption considerably may distort the appearance of this curve. The regular markings along the time axis $t$ in FIG. 2 represent the instants of time according to the clock pulse oscillator 3 in FIG. 1 when sampling is made of the potential in the regenerator 14. At these instants of time is determined the polarity of the rectangular wave of given amplitude according to FIG. 3 emanating from the regenerator.

The amplitude control means and appertaining instruments will now be described more closely in the following.

The general arrangement of an intelligence transmission receiver for frequency shift modulation shown in FIGS. 1 to 3 is known per se except the amplitude control assembly and frequency converters 6 and 11 illustrated in FIG. 1. It has been pointed out in the foregoing that phase distortion, disturbances, interruptions and the like may distort the potential according to FIG. 2 occurring at the output of the discriminator 13. Provided, that these disturbing effects or influences are not too severe, correct polarity at the sampling instants marked in FIG. 2 will still be obtainable so that correct reproduction of the characters and the like will be secured at the output of the regenerator. However, in case of extremely strong phase distortion, other disturbances or the like, there is considerable risk that the characters or the like may be reproduced incorrectly.

Now, the invention simply consists in that an arrangement 17 for amplitude control of any conventional type is connected to the output of the discriminator (13) and also to the outlet from the clock pulse oscillator 16 so as to control the signals and assure that the base-band signal at the sampling instants according to FIG. 2, irrespective of polarity, has the correct amplitude with a certain margin—upwards and downwards—corresponding to maximally admissible deviation in response to phase distortion, disturbances and the like. It is obvious that this margin must be considerably reduced, if a highly limited percentage of faults is desired, say a maximum of one fault per $10^5$ characters or the like, than if a higher fault percentage may be tolerated. The clock pulse oscillator 16 at the receiving end is controlled in response to the received signals to perfect synchronism with the signal elements in the transmitted intelligence. The clock pulse oscillator requires a given period of initial transients at the transmission so as to establish synchronism and maintain the synchronism during a given period of transients.

Thus, the arrangement for amplitude control 17 in conjunction with a dial indicator 18 additionally connected to the outlets of the discriminator and of the clock pulse oscillator in a simple manner provides for an indication of the correct setting or adjustment of a variable phase equalizer—if such an equalizer is included in which case the different stages thereof are adjusted until the amplitude control arrangement indicates that the amplitude of the base-band signal occupies its most favourable position within the given range of tolerances. Moreover, irrespective of the presence or absence of such a phase equalizer there is also obtained a simple indication of whether or not a given telephone line is at all capable of being used for intelligence transmission with the intended speed. For example, if a telephone connection or line incidentally has been seized between a transmitting and a receiving terminal station in a wholly automatic telephone system, the line will be tested prior to the transmission by means of the present arrangement. If this does not provide any satisfactory result, a new test will be made, until a line has been found exhibiting sufficiently good transmission properties or quality. It must be recognized that all telephone lines are not of the same class with respect to phase distortion and the like.

The third application of vital importance of the invention resides in that incidental faults affecting individual or short trains of characters or the like are indicated to the error detector from the amplitude control arrangement thereby advising that the amplitude of the pulses occurs outside the permissible range.

Obviously, the present invention may be used in conjunction and simultaneously with conventional means for redundancy or similar control in order to secure an extra high degree of protection against errors. In the same manner the invention may be employed in combination with the arrangement according to United States Patent No. 3,145,340 entitled "Control Arrangement for Intelligence Transmission."

We claim:

1. In an intelligence transmission system for transmitting a plurality of data signal elements from a sender terminal to a receiver terminal and for error-checking the said transmission, means in the sender terminal for receiving said data signals, controlling said data signals in a predetermined rhythm, modulating and frequency-shifting said data signal elements and for transmitting, at a constant amplitude, said resultant signal elements to said receiver terminal, means in said receiver terminal for frequency-shifting the said resultant signal elements, demodulating said frequency shifted signals, generating clock pulses synchronized in accordance with said predetermined rhythm, detecting the amplitude of said frequency-shifted signal elements, and for indicating a transmission error responsive to the amplitude of the last-said signal elements lying outside of predetermined amplitude limits, the said means for detecting including means controlled by said clock pulses for sampling the said elements at the predetermined times.

2. An intelligence transmission system as set forth in claim 1 wherein the said means for indicating a transmission error includes visual indicator means for visually indicating the said detected amplitude.

3. An intelligence transmission system as set forth in claim 1 wherein said receiver terminal includes adjustable phase equalizing means for varying the phase of the said resultant signal elements.

References Cited by the Examiner

UNITED STATES PATENTS

| | | | |
|---|---|---|---|
| 2,928,897 | 3/60 | Koolhof | 178—69 |
| 3,008,005 | 11/61 | Barry et al. | 178—23.1 |
| 3,069,497 | 12/62 | Hennig | 178—69 |

OTHER REFERENCES

Freiman: "Variable Threshold Error Correction," IBM Tech. Disclosure Bulletin, vol. 4, No. 7, Dec. 1961, p. 102.

DAVID G. REDINBAUGH, *Primary Examiner.*